US010194469B2

(12) United States Patent
Bhalla

(10) Patent No.: US 10,194,469 B2
(45) Date of Patent: Jan. 29, 2019

(54) ENABLING DIFFERENT DEVICE TRIGGERING ASPECTS IN A MACHINE TO MACHINE COMMUNICATION SYSTEM

(71) Applicant: ZTE Corporation, Shenzhen (CN)

(72) Inventor: Rajesh Bhalla, Gahanna, OH (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/118,068

(22) PCT Filed: Feb. 10, 2015

(86) PCT No.: PCT/US2015/015274
§ 371 (c)(1),
(2) Date: Aug. 10, 2016

(87) PCT Pub. No.: WO2015/120477
PCT Pub. Date: Aug. 13, 2015

(65) Prior Publication Data
US 2016/0366716 A1 Dec. 15, 2016

Related U.S. Application Data

(60) Provisional application No. 61/991,608, filed on May 11, 2014, provisional application No. 61/941,359, (Continued)

(51) Int. Cl.
*H04W 76/14* (2018.01)
*H04W 76/02* (2009.01)
(Continued)

(52) U.S. Cl.
CPC ......... *H04W 76/023* (2013.01); *H04L 61/106* (2013.01); *H04W 4/70* (2018.02); *H04W 76/14* (2018.02); *H04L 67/12* (2013.01)

(58) Field of Classification Search
CPC ..... H04L 61/106; H04L 67/12; H04L 67/306; H04W 4/005; H04W 60/04; H04W 76/023; H04W 4/70; H04W 76/14
See application file for complete search history.

(56) References Cited

U.S. PATENT DOCUMENTS

2011/0213871 A1 9/2011 DiGirolamo et al.
2012/0296968 A1 11/2012 Lin et al.
(Continued)

FOREIGN PATENT DOCUMENTS

WO 2013/073747 A1 5/2013
WO 2013/074849 A1 5/2013
(Continued)

OTHER PUBLICATIONS

3GPP TSG SA WG2 Meeting #78, "Device triggering and E.164 MSISDN replacement," TD S2-101169, San Francisco, California, USA, pp. 1-4, Feb. 2010.
(Continued)

*Primary Examiner* — Quoc Thai N Vu
(74) *Attorney, Agent, or Firm* — Perkins Coie LLP

(57) ABSTRACT

In a machine to machine (M2M) communication system, a request for a service targeted to a common service entity (CSE) with a CSE-ID is received from an underlying network, a M2M device which is associated with the CSE ID for the service request is identified using a M2M external identifier (M2M-Ext-ID). Provisioning operations for a pre-provisioned M2M-Ext-ID and a dynamic M2M-Ext-ID are performed at different domains from each other.

18 Claims, 9 Drawing Sheets

Related U.S. Application Data filed on Feb. 18, 2014, provisional application No. 61/940,489, filed on Feb. 16, 2014, provisional application No. 61/938,115, filed on Feb. 10, 2014.

(51) Int. Cl.
*H04L 29/12* (2006.01)
*H04W 4/70* (2018.01)
*H04L 29/08* (2006.01)

(56) References Cited

U.S. PATENT DOCUMENTS

| | | |
|---|---|---|
| 2013/0003609 A1 | 1/2013 | Ballot et al. |
| 2013/0013793 A1 | 1/2013 | Sanchez Herrero |
| 2013/0016657 A1 | 1/2013 | Muhanna et al. |
| 2013/0060664 A1 | 3/2013 | Macrae |
| 2013/0094444 A1 | 4/2013 | Lai et al. |
| 2013/0103842 A1 | 4/2013 | Seed et al. |
| 2013/0157673 A1 | 6/2013 | Brusilovsky |
| 2013/0188515 A1 | 7/2013 | Pinheiro et al. |
| 2013/0203412 A1 | 8/2013 | Starsinic et al. |
| 2013/0250968 A1 | 9/2013 | Zhou et al. |
| 2013/0332627 A1 | 12/2013 | Skog et al. |
| 2013/0343538 A1* | 12/2013 | Mizikovsky ......... H04W 12/06 380/255 |
| 2013/0346504 A1 | 12/2013 | Huang et al. |
| 2014/0086144 A1* | 3/2014 | Foti .................. H04L 61/106 370/328 |
| 2015/0264634 A1* | 9/2015 | Ding .................. H04W 4/001 455/434 |
| 2015/0350904 A1 | 12/2015 | Kim et al. |
| 2015/0358874 A1 | 12/2015 | Ahn et al. |
| 2016/0359797 A1 | 12/2016 | Bhalla |
| 2016/0360340 A1 | 12/2016 | Bhalla |
| 2017/0026774 A1* | 1/2017 | Koshimizu ........... H04W 4/005 |

FOREIGN PATENT DOCUMENTS

| | | |
|---|---|---|
| WO | 2013/171722 A2 | 11/2013 |
| WO | 2013/190402 A1 | 12/2013 |
| WO | 2015/120480 A1 | 8/2015 |
| WO | 2015/120484 A1 | 8/2015 |

OTHER PUBLICATIONS

Bhalla, R., "Discussions on Triggering Aspects in oneM2M," oneM2M Input Contribution, oneM2M Partners, Doc# ARC-2014-0125—Discussion on Triggering Aspects in oneM2M, pp. 1-13, Feb. 2014.

Bhalla, R., "M2M-Node-ID attribute for non-CSE Capable AEs," oneM2M Input Contribution, oneM2M Partners, Doc# ARC-2014-0126—M2M-Node-ID for non-CSE capable Entities, pp. 1-5, Feb. 2014.

Bhalla, R., "pointOfAccess attribute for non-CSE Capable AEs," oneM2M Input Contribution, oneM2M Partners, Doc# ARC-2014-0123—pointOfAccess for AEs on non-CSE capable Entities, pp. 1-5, Feb. 2014.

Bhalla, R., "Some Enhancements for Supporting Device Triggering," oneM2M Input Contribution, oneM2M Partners, Doc# ARC-2014-0127—some enhancements for supporting device triggering, pp. 1-4, Feb. 2014.

Bhalla, R., "Underlying Network Identifier," oneM2M Input Contribution, oneM2M Partners, Doc# ARC-2014-0124—Underlying Network Identifier, pp. 1-3, Feb. 2014.

Bhalla, R., et al., "Application Port ID," oneM2M Input Contribution, oneM2M Partners, Doc# ARC-2014-1179—Application_Port_ID_DOC, pp. 1-8, Feb. 2014.

European Extended Search Report dated Feb. 2, 2017 for European Patent Application No. 15746113.8, filed on Feb. 10, 2015 (8 pages).

European Extended Search Report dated Feb. 2, 2017 for European Patent Application No. 15747056.8, filed on Feb. 10, 2015 (10 pages).

European Extended Search Report dated Feb. 6, 2017 for European Patent Application No. 15747005.5, filed on Feb. 10, 2015 (12 pages).

Foti, G., et al., "Functional architecture in oneM2M-TS-0001 oneM2M Functional Architecture-V-0.0.2," oneM2M Input Contribution, oneM2M Partners, Doc# oneM2M-ARC-2013-0347, pp. 1-3, Jul. 2013.

International Search Report and Written Opinion dated Apr. 28, 2015 for International Application No. PCT/US2015/015287, filed on Feb. 10, 2015 (10 pages).

International Search Report and Written Opinion dated Apr. 28, 2015 for International Application No. PCT/US2015/015274, filed on Feb. 10, 2015 (11 pages).

International Search Report and Written Opinion dated Apr. 28, 2015 for International Application No. PCT/US2015/015280, filed on Feb. 10, 2015 (7 pages).

Jacobs, P., et al., "WI 0002-onem2m Architecture; Technical Specification—M2M Architecture," oneM2M Partners, pp. 1-4, Dec. 2013, Retrieved from the Internet <URL:http://ftp.onem2m.org/meetings/ARC/2013meetings/20131209_ARC8.0_Miyazaki/OneM2M-ARC-2013-0509R04-Revision_of figure_6-1_DOC> [retrieved on Jan. 26, 2017].

Katusic, D., et al., "Universal Identification Scheme in Machine-to-Machine Systems," IEEE Proceedings of the 12th International Conference on Telecommunications (ConTEL 2013), Zagreb, Croatia, pp. 71-78, Jun. 2013.

Kim, S., et al., "Overall Procedure Discussion related to Security," oneM2M Partners, pp. 1-9, Jan. 2014, Retrieved from the Internet <URL:http://ftp.onem2m.org/meetings/SEC/2014 meetings/20140115_SEC-ah/SEC-2014-0008-Overall_Procedure_Discussion_related_to_Security.PPT> [retrieved on Jan. 26, 2017].

Office Action dated Oct. 10, 2017 for Japanese Patent Application No. 2016-551238, filed on Feb. 10, 2015 (9 pages).

Office Action dated Oct. 17, 2017 for Japanese Patent Application No. 2016-551158, filed on Feb. 10, 2015 (5 pages).

Office Action dated Sep. 26, 2017 for Japanese Patent Application No. 2016-551156, filed on Feb. 10, 2015 (4 pages).

OneM2M Technical Specification, "oneM2M Functional Architecture Baseline Draft," oneM2M Partners, Doc# oneM2M-TS-0001—V-2014-08, pp. 1-297, Aug. 2014, <URL:http://www.onem2m.org/images/files/deliverables/TS-0001-oneM2M-Functional-Architecture-V-2014-08.pdf>.

OneM2M Technical Specification, "oneM2M Functional Architecture," oneM2M Partners, Doc# oneM2M-TS-0001—V-0.3.2, pp. 1-171, Jan. 2014, <URL:http://ftp.onem2m.org/Meetings/ARC/2014%20meetings/20140109_ARC8.1/ARC-2014-0618R02-Functional_Architecture_Spec_TS-0001_v0_3_2_Draft-Baseline.ZIP>.

OneM2M Technical Specification, "oneM2M Functional Architecture," oneM2M Partners, Doc# oneM2M-TS-0001—V-0.4.0, pp. 1-169, Feb. 2014, <URL:http://member.onem2m.org/Application/documentapp/downloadimmediate/default.aspx?docID=4723>.

Yu, J., "How to Name Your M2M Device," Neustar Blog, pp. 1-5, Feb. 2012, Retrieved from the Internet <URL: https://www.neustar.biz/blog/how-to-name-your-m2m-device> [retrieved on Jan. 26, 2017].

"Machine-to-Machine communications (M2M); Functional architecture," ETSI TS 102 690 v2.1.1, Technical Specification, 332 pages, Oct. 2013.

* cited by examiner

ENABLING DIFFERENT DEVICE TRIGGERING ASPECTS IN A MACHINE TO MACHINE COMMUNICATION SYSTEM

CROSS REFERENCE TO RELATED APPLICATIONS

This patent document claims the benefit of priority of U.S. Provisional Patent Application No. 61/938,115, filed on Feb. 10, 2014; U.S. Provisional Patent Application No. 61/940,489, filed on Feb. 16, 2014; U.S. Provisional Patent Application No. 61/941,359, filed on Feb. 18, 2014; and U.S. Provisional Patent Application No. 61/991,608, filed on May 11, 2014. The entire contents of the before-mentioned patent applications are incorporated by reference as part of the disclosure of this document.

BACKGROUND

This document relates to machine-to-machine (M2M) communication.

M2M communication generally refers to communication between two different devices, which is not explicitly triggered by a user. Devices may perform M2M communication using wired or wireless connectivity. The communication is typically initiated by an application residing on one of the machine to gather or send information to a counterpart application on the other machine.

SUMMARY

This document describes technologies, among other things, for facilitating communication between M2M devices. Using the disclosed techniques, in some embodiments, M2M communication end points or application entities on them can be triggered to facilitate communication between end points.

In one example aspect, methods, systems and apparatus for facilitating M2M communications include receiving a request for a service targeted to a common service entity (CSE) with a CSE-ID from an underlying network, identifying an M2M device associated with the CSE-ID for the service request using an M2M external identifier (M2M-Ext-ID) and performing provisioning operations for a pre-provisioned M2M-Ext-ID and a dynamic M2M-Ext-ID at different domains from each other.

In another example aspect, techniques for facilitating M2M communication include receiving a request from an underlying network for a device triggering service, identifying a remote entity to which the triggering is routed using a Trigger-Recipient-ID, and performing provisioning operations for a pre-provisioned M2M-Ext-ID and a dynamic M2M-Ext-ID at different domains from each other.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

The following abbreviations are used in this document.
ADN: Application Dedicated Node.
ADN-AE: AE which resides in the Application Dedicated Node.
AE: Application Entity.
App: Application.
ASN: Application Service Node.
ASE-AE: Application Entity that is registered with the CSE in the Application Service Node.
ASN-CSE: CSE which resides in the Application Service Node.
BBF: Broadband Forum.
CSE: Common Service Entity.
CSF: Common Service Function.
EF: Enabler Function.
IEEE: Institute of Electrical and Electronics Engineers.
IETF: Internet Engineering Task Force.
IN: Infrastructure Node.
IN-AE: Application Entity that is registered with the CSE in the Infrastructure Node.
IN-CSE: CSE which resides in the Infrastructure Node.
JNI: Java Native Interface.
LTE: Long Term Evolution.
MAC: Medium Access Control.
M2M: Machine to machine.
MN: Middle Node.
MN-CSE: CSE which resides in the Middle Node.
NSE: Network Service Entity.
SDO: Standards development organization.
SP: Service Provider.
UNet: Underlying network (in which an M2M device resides).

In Machine-to-Machine (M2M) communication, two devices, e.g., an application server and an M2M capable device, may communicate with each other without a human user explicitly initiating the communication. In M2M communications, the two endpoints between which communication occurs often are in different networks. In a typical application scenario, one endpoint may be a sensor or a utility box that may go offline for extended time periods and another endpoint may be an application server such as a utility billing server or an M2M server that may be deployed in a managed network. Data packets traveling back and forth between these two end points may be routable via various routing options. For example, one endpoint may have connectivity over a licensed spectrum (e.g., Long Term Evolution) or an unlicensed spectrum (e.g., Wi-Fi). When one endpoint is offline for extended time periods, e.g., days or weeks, the way in which packets were routed to that end point during a last communication session may not necessarily the way in which the packets can be routed in a current communication session. Furthermore, various routing options may incur various costs (e.g., bandwidth charges or power dissipation during transmission).

Figure 1:
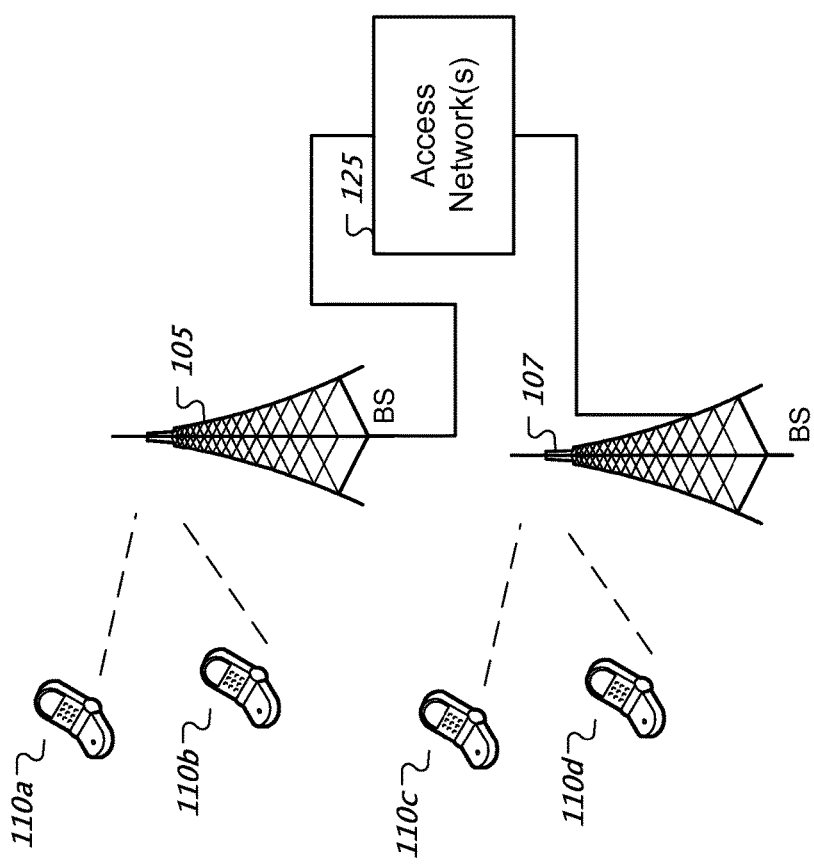
FIG. 1 depicts example wireless network architecture.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
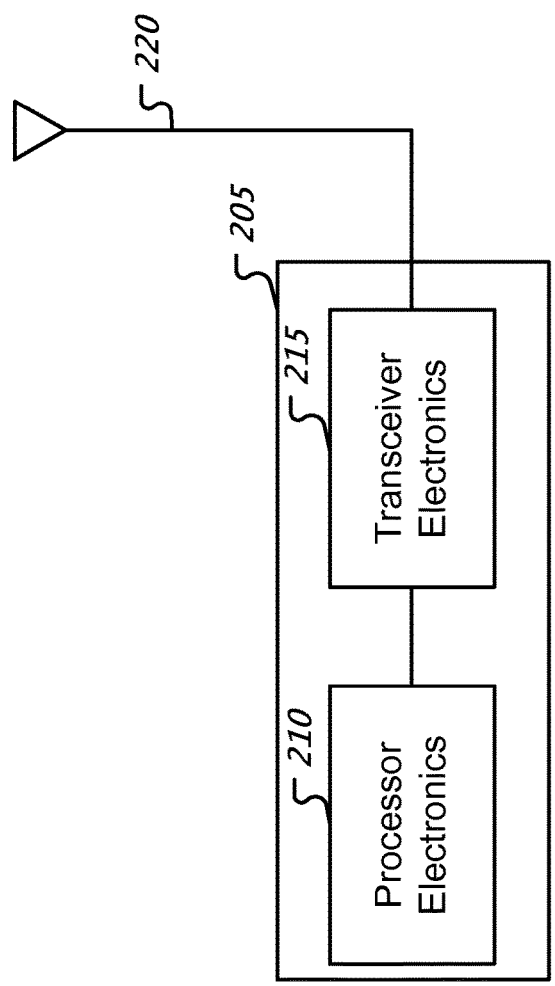
FIG. 2 is a block diagram of a radio device operable in a wireless network.

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA or GSM based air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA2000 1x, HRPD, WiMAX, GSM, LTE, and Universal Mobile Telecommunications System (UMTS).

In some implementations, a radio station 205 may additionally be configured with a local area network connectivity such as a 802.11 (a/b/g/n) interface. The availability of such an interface may make it possible to communicatively couple the radio station 205 to the Internet via the local area connection. For example, a user may access services over her user equipment (UE) by connecting to the service via a wireless local area network connection (e.g., home Wi-Fi access) through a fixed broadband network such as a cable modem network or a DSL network. The above described radio station 205 may be used to implement techniques disclosed in the present document.

In order to save power or other resources, some M2M devices or application entities running on these devices may go "offline" from time to time. To re-establish an application layer communication, these M2M entities may be to be awaken prior to the communication. The manner in which triggering is performed or the exact module or entity that can be woken up may depend on configuration and capabilities of individual M2M devices.

Service Layer specifications developed by organizations such as one M2M, ETSI TC M2M, TIA TR-50 etc. (M2M SDOs) need to support efficient deployment of M2M solutions by a wide range of market-focused (vertical) organizations. With the focus on the service layer, such organizations have been taking transport network-independent view of the end-to-end services. Yet, they need to make sure that their service layer specifications can be used effectively for interfacing with different types of transport networks. Such transport networks include but are not limited to the wireless and wireline networks being defined by 3GPP, 3GPP2, IEEE, IETF and BBF.

In the service layer specification, currently, there is no way for a service request to identify a particular M2M device associated with the entity that holds the common service resources to fulfil the M2M request. Furthermore, when a sleeping M2M device may have to be triggered to awaken to fulfil an M2M communication request, current systems are limited in way by which a triggering device to which the request may have to be routed is specified. The techniques presented in this document solve these problems, and others.

Figure 3:
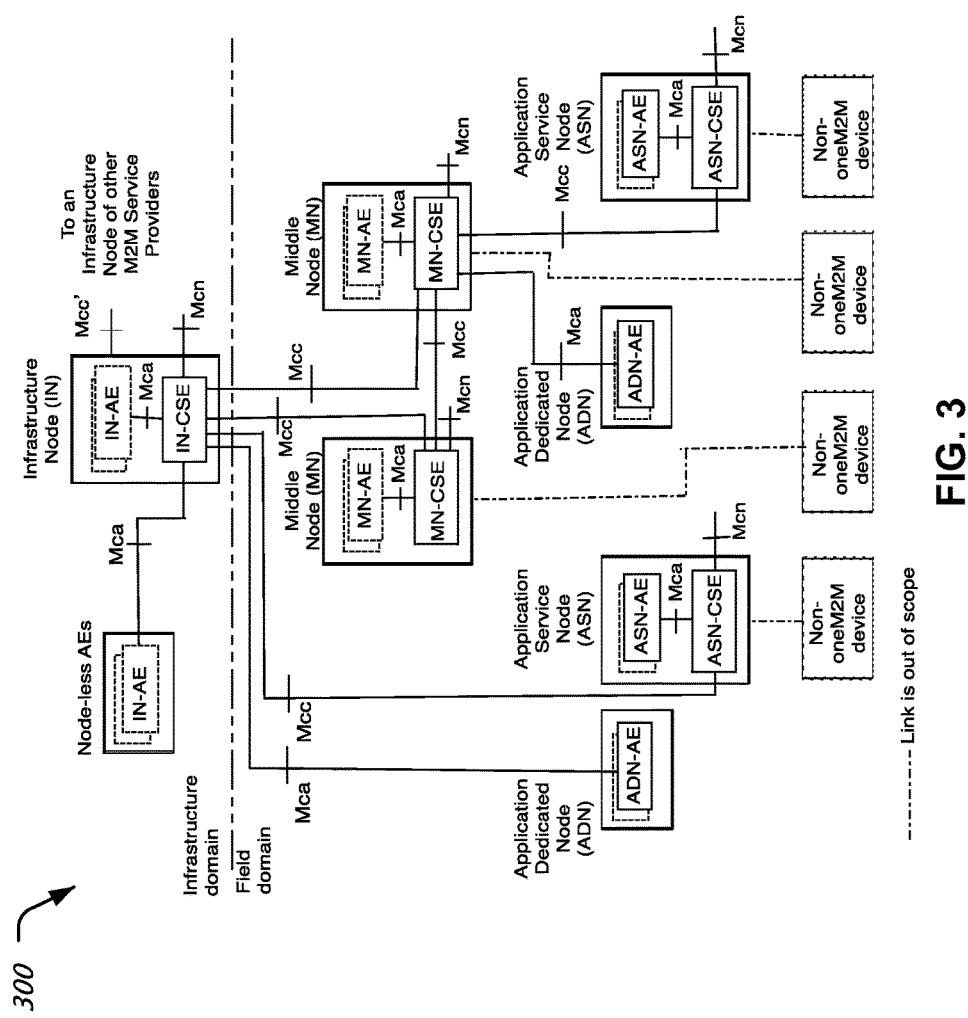
FIG. 3 shows an example or architecture of an M2M communication system.

FIG. 3 illustrates some possible configurations 300 supported by a one M2M System. FIG. 3 is an extract from the Functional Architecture specification being developed by one M2M.

In this example illustration 300, Application Entities (AEs) on ADN (ADN-AEs) may register with IN-CSE. Similarly Node-less AEs can register with IN-CSE. ADN-AEs may register with MN-CSE as well. Such registrations are registrations between AEs and CSEs at remote entities/Nodes.

A CSE is an instantiation of one or more CSFs. A CSE provides a subset of CSFs that could be used and shared by M2M Applications. A CSE can utilize UNet capabilities and can interact with other CSEs to fulfil the service. A CSE comprises the set of "service functions" that are common to the M2M environments. Such service functions are exposed to other entities through Reference Points such as the Mca and Mcc reference points specified in one M2M (see FIG. 3). The Mcc reference point defines communication flows between CSEs. The reference point Mcn is used for accessing Underlying Network Service Entities. Examples of service functions offered by CSE are: Data Management, Device Management, M2M Subscription Management, Location Services etc. Such "subfunctions" offered by a CSE may be logically apprehended as Common Services Functions (CSFs). Inside a Common Services Entity (CSE), some of the CSFs can be mandatory and others can be optional. Also, inside a CSF, some subfunctions can be mandatory or optional (e.g., inside a "Device Management" CSF, some of the subfunctions like "Application Software Installation", "Firmware Updates", "Logging", "Monitoring", etc. can be mandatory or optional).

A CSF is a set of service functions that are common to the M2M environment and specified by an interworking specification such as one M2M.

In FIG. 3, the following abbreviations are used:

Node-less AEs: This entity indicates that IN-AEs may be hosted by an Application Service Provider.

Node: A functional entity that contains at least one Common Services Entity (CSE) and/or one Application Entity (AE). A node may be contained in a physical apparatus, e.g., an M2M device, a Gateway or a Server Infrastructure. In general, CSEs resident in different nodes are not identical and are dependent on the services supported by the CSE in that node. In some embodiments, two types of nodes are defined. One type of node is a functional entity that contains at least one Common Services Entity and/or one or more one M2M Application Entities. Such nodes may be referred to as CSE-capable nodes. The other type of node is a functional entity that shall contain one or more Application Entities, and no Common Service Entity. Such nodes may be referred to as non-CSE-capable nodes. In a one M2M architecture, a CSE-capable one M2M node may be contained in a physical object e.g., M2M Device, Gateway or Server Infrastructure. Non-CSE-capable one M2M node may be contained in physical objects such as sensors, actuators etc. CSE-capable and non-CSE capable nodes communicate over Mca reference Point The Mcc' reference point aims to be as similar as possible to the Mcc reference point. But due to the nature of inter-M2M Service Provider communications, some differences may exist.

Many different types of nodes may exist in the configuration 300. A node is not necessarily mapped to a single actual physical object, although it may be mapped to actual physical objects. The nodes may include:

Application Service Node (ASN): An Application Service Node is a node that contains one Common Services Entity and contains at least one Application Entity. An Application Service Node may communicate over a Mcc reference point with either: exactly one Middle Node; or exactly one Infrastructure Node. Example of physical mapping includes an Application Service Node could reside in an M2M Device.

Application Dedicated Node (ADN): An Application Dedicated Node may contain at least one Application Entity and does not contain a Common Services Entity. An Application Dedicated Node communicates with a Middle Node or an Infrastructure Node over an Mca reference point. Examples of physical mapping include an Application Dedicated Node that could reside in a constrained M2M Device.

Middle Node (MN): A Middle Node is a node that contains one Common Services Entity and contains zero or more Application Entities. A Middle Node communicates with either an IN or another MN over Mcc, plus at least an IN/MN/ASN over Mcc, or an ADN over Mca. Examples of physical mapping may include a Middle Node that could reside in an M2M Gateway.

Infrastructure Node (IN): An Infrastructure Node is a node that contains one Common Services Entity and contains zero or more Application Entities. An Infrastructure Node communicates over respective Mcc reference points with one or more Middle Node(s); and/or one or more Application Service Node(s). In addition, an Infrastructure Node communicates with one or more Application Dedicated Nodes over respective Mca reference points. Example of physical mapping: an Infrastructure Node could reside in an M2M Server Infrastructure.

M2M External Identifier (M2M-Ext-ID)

The M2M-Ext-ID is used by an M2M SP when services targeted to a CSE, identified by a CSE-ID, are requested from the underlying network.

The M2M External Identifier allows the underlying network to identify the M2M device associated with the CSE-ID for the service request. To that effect, the underlying network maps the M2M-Ext-ID to the UNet-specific Identifier it allocated to the target M2M Device. In addition, the M2M SP can maintain the association between the CSE-ID, the M2M-Ext-ID and the identity of the UNet.

In various embodiments, both pre-provisioned and dynamic association between the CSE-ID with the M2M-Ext-ID can be implemented.

For each CSE-ID, there should be only one M2M-Ext-ID for a specific underlying network identifier, or UNetwork-ID. Hence an M2M SP interworking with multiple underlying networks will have different M2M-Ext-IDs associated with the same CSE-ID, one per underlying network and will select the appropriate M2M-Ext-ID for any service request it initiates towards an underlying network.

In general, the mapping by the UNet of the M2M-Ext-ID to the M2M Device is UNet-Specific.

In some configurations, the UNet provider and the M2M Service Provider may collaborate for the assignment of an M2M-Ext-ID to each CSE identified by CSE-ID. At the same time, the UNet provider maintains association of the M2M-Ext-ID with the UNet-specific Identifier allocated to the M2M device that hosts such CSE.

For pre-provisioned M2M-Ext-IDs, the M2M-Ext-ID along with the associated CSE-ID may be provisioned at the Infrastructure Node. The CSE at an M2M device does not need to have knowledge of the M2M-Ext-ID assigned to it. For dynamic M2M-Ext-IDs, the M2M-Ext-ID specific to the Underlying Network is provisioned at each M2M device in the Field Domain. Such M2M-Ext-ID is conveyed to the IN-CSE during CSE Registration.

Trigger Recipient Identifier (Trigger-Recipient-ID)

The Trigger-Recipient-ID is used when device triggering services are requested from the UNet, to identify an instance of an ASN/MN-CSE on an execution environment, to which the trigger is to be routed. For example, when 3GPP device triggering is used, the Trigger-Recipient-ID would map to the Application-Port-Identifier, e.g., specified in the Specification 3GPP 23.682.

For pre-provisioned M2M-Ext-IDs, Trigger-Recipient-ID is provisioned at the Infrastructure Node along with the M2M-Ext-ID and the associated CSE-ID. For dynamic M2M-Ext-IDs, Trigger-Recipient-ID specific to the underlying network is provisioned at each M2M device in the Field Domain. Such Trigger-Recipient-ID is conveyed to the IN-CSE during CSE Registration.

Table 1 below lists examples of certain M2M identifiers and their usage properties. In particular, as listed in Table 1, the external identifier is jointly assigned between UNet provider and the M2M SP, and assigned to the M2M node belonging to the CSE that wants to utilize the services of the UNet and may have two provisioning modes—a pre-provisioning mode and a dynamic mode in which the external identifier is conveyed during the registration of the corresponding CSE.

M2M Identifiers Lifecycle and Characteristics

TABLE 1

| Identifier | Assigned by | Assigned to | Assigned during | Lifetime | Uniqueness | Used during | Remark |
|---|---|---|---|---|---|---|---|
| M2M Service Provider Identifier | Out of scope | AE, CSE | Out of scope | Out of scope | Global | Provisioning | |
| Application Entity Identifier | AE or Registrar CSE | AE | AE start-up | Application Entity Registration | Global | Application Entity Registration Security Context Establishment All other operations initiated by the AE | Security requirements apply for Security Context Establishment |
| Application Identifier | Out of scope | Out of scope | Pre-provisioned | Out of scope | Specific to M2M service deployment | Application Entity registration | |
| CSE Identifier | M2M SP | CSE | Security Provisioning | Life of the CSE | Global | Information flows (clause 10) Security Context Establishment | Security requirements apply for Security Context Establishment |
| M2M Node Identifier | Out of Scope | M2M Node hosting CSE | Pre-provisioned | Life of the M2M Node | Global | Device Management | Needs to be Read Only |
| M2M Subscription Identifier | M2M SP, Out of Scope | Application Entities, and one or more CSEs belonging to the same M2M subscriber | At service signup | Life of the M2M Service Subscription with the MM SP | Global | Charging and Information Recorded Role based access control Authentication | Multiple CSEs can be allocated the same M2M Subscription Identifier |
| M2M-Request-ID | Mcc: CSE Mca: Application Entity | A request initiated by an AE or CSE | Mcc: When a request is initiated by a CSE, or handling of a request received by a CSE. Mca: When a request is initiated by an AE | Equal to the lifetime of the Request and its corresponding Response | Mcc: Global Mca: Local or global | Requests and corresponding responses | |
| External Identifier | Jointly between the Underlying Network provider and M2M SP, where applicable. | M2M Node belonging to a CSE that wants to utilize services of the Underlying Network. | Administrative Agreement. | Life of the CSE. | Local or global, decided by the specific Underlying Network provider | Requests initiated by a CSE over the Mcn reference point, where applicable. | Pre-Provisioned Mode: Provisioned at the Infrastructure Node. Dynamic Mode: Provisioned at M2M device. Conveyed to IN-CSE during CSE Registration. |
| Underlying Network Identifier | M2M SP | Underlying Networks | Pre-provisioned | Life of the Underlying Network | Local to M2M SP domain | UL Network selection | |

TABLE 1-continued

| Identifier | Assigned by | Assigned to | Assigned during | Lifetime | Uniqueness | Used during | Remark |
|---|---|---|---|---|---|---|---|
| Trigger Recipient Identifier | Execution Environment | ASN/MN-CSE | ASN/MN-CSE start-up or wake-up | Life of the CSE | Execution Environment-wide | Device Triggering procedures, where applicable | Pre-Provisioned Mode: Provisioned at Infrastructure Node along with M2M-Ext-ID Dynamic Mode: Provisioned at M2M device. Conveyed to IN-CSE during CSE Registration along with M2M-Ext-ID |
| M2M Service Identifier | M2M Service Provider, Out of Scope | A service defined by the M2M Service Provider which consists of a set of functions | | | Local to the M2M Service Provider | For M2M Service Subscription | |

Resource Type CSEBase

A <CSEBase> resource can be used to represent a CSE. This <CSEBase> resource shall be the root for all the resources that are residing on the CSE.

Figure 4A:
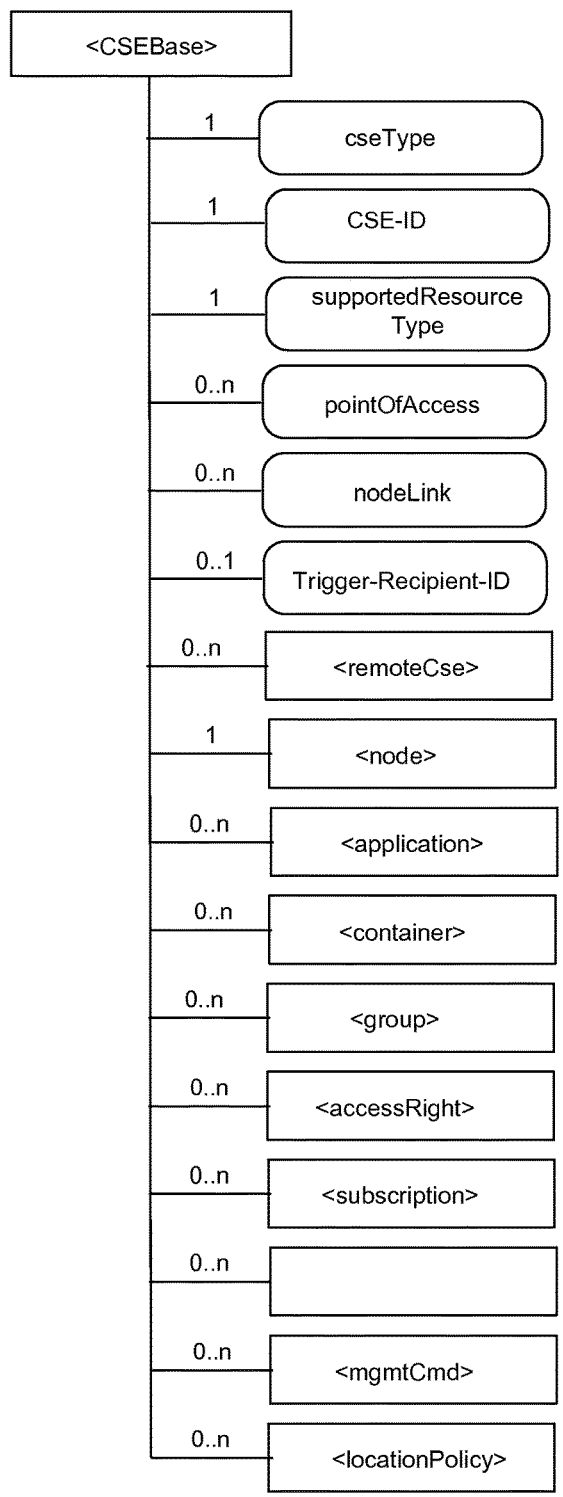
FIG. 4A shows an example of a CSEBase resource.

FIG. 4A shows an example listing of attributes included in a CSEBase resource.

The <CSEBase> resource may contain the child resources in Table 2.

TABLE 2

| Child Resource Name of <CSEBase> | Child Resource Type | Multiplicity | Description |
|---|---|---|---|
| [variable] | <remoteCSE> | 0 . . . n | |
| [variable] | <node> | 0 . . . n | |

TABLE 2-continued

| Child Resource Name of <CSEBase> | Child Resource Type | Multiplicity | Description |
|---|---|---|---|
| [variable] | <AE> | 0 . . . n | |
| [variable] | <container> | 0 . . . n | |
| [variable] | <group> | 0 . . . n | |
| [variable] | <accessControlPolicy> | 0 . . . n | |
| [variable] | <subscription> | 0 . . . n | |
| [variable] | <mgmtCmd> | 0 . . . n | |
| [variable] | <locationPolicy> | 0 . . . n | |
| [variable] | <statsConfig> | 0 . . . n | |
| [variable] | <statsCollect> | 0 . . . n | |

The <CSEBase> resource may contain the attributes described in Table 3.

TABLE 3

| Attribute Name of <CSEBase> | Multiplicity | RW/RO/WO | Description |
|---|---|---|---|
| resourceType | 1 | RO | |
| creationTime | 1 | RO | |
| lastModifiedTime | 1 | RO | |
| accessControlPolicies | 0 . . . 1 | RW | |
| labels | 0 . . . 1 | RW | |
| cseType | 1 | WO | Indicates the type of CSE node represented by the created resource. |
| CSE-ID | 1 | WO | The globally unique CSE identifier. |
| supportedResourceType | 1 | RO | List of the resource types which are supported in CSE. |

TABLE 3-continued

| Attribute Name of <CSEBase> | Multiplicity | RW/ RO/ WO | Description |
|---|---|---|---|
| pointOfAccess | 0 . . . n | RW | Represents the list of physical addresses to be used by remote CSEs to connect to this CSE (e.g., IP address, FQDN). This attribute is used to announce its value to remote CSEs. |
| nodeLink | 0 . . . 1 | RO | A reference (URI) of a <node> resource that stores the node specific information. |
| M2M-Ext-ID | 0 . . . 1 | RW | Supported at ASN-CSE/MN-CSE only. See clause 7.1.8 where this attribute is described. This attribute is used only in case of dynamic association of M2M-Ext-ID and CSE-ID |
| Trigger-Recipient-ID | 0 . . . 1 | RW | Supported at ASN-CSE/MN-CSE only. This attribute is used only in case of dynamic association of M2M-Ext-ID and CSE-ID |
| notificationCongestion Policy | 0 . . . 1 | RO | This attribute applies to CSEs generating subscription notifications. It specifies the rule which is applied when the storage of notifications for each subscriber (an AE or CSE) reaches the maximum storage limit for notifications for that subscriber. E.g., Delete stored notifications of lower notificationStoragePriority to make space for new notifications of higher notificationStoragePriority, or delete stored notifications of older creation Time to make space for new notifications when all notifications are of the same notificationStoragePriority. |

Resource Type RemoteCSE

A <remoteCSE> resource represents a remote CSE that is registered to the Registrar CSE. The <remoteCSE> resources may be located directly under the <CSEBase>. Conversely each registered CSE may also be represented as a sub-set of <remoteCSE> resource in the registering CSE's <CSEBase>. For example, when CSE1 registers with CSE2, there will be two <remoteCSE> resources created: one in CSE1 <CSEBase1>/<remoteCSE2> and one in CSE2 <CSEBase2>/<remoteCSE1>. The creation of the two resources does not necessarily imply mutual registration. The <CSEBase1>/<remoteCSE2> does not automatically mean CSE2 registered with CSE1 in the example above.

The <remoteCSE> resource may include child resources, e.g., as listed in Table 4.

Figure 4B:
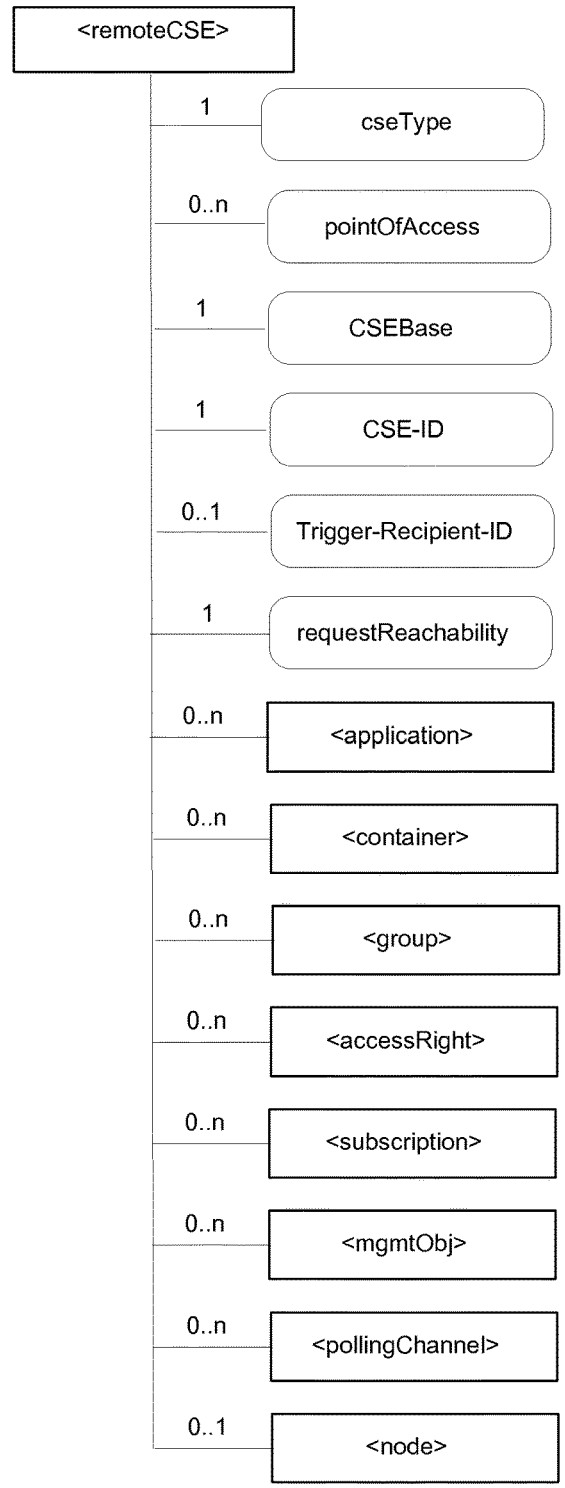
FIG. 4B shows an example of a remoteCSE resource.

FIG. 4B lists an example of child resources included with a <remoteCSE> resource.

TABLE 4

| Child Resource Name of <remoteCSE> | Child Resource Type | Multiplicity | Description | <remoteCSEAnnc> Child Resource Types |
|---|---|---|---|---|
| [variable] | <AE> | 0 . . . n | | AE <AEAnnc> |
| [variable] | <container> | 0 . . . n | | <container> <containerAnnc> |
| [variable] | <group> | 0 . . . n | | <group> <groupAnnc> |
| [variable] | <accessControl Policy> | 0 . . . n | | <accessControl Policy> <accessControl PolicyAnnc> |
| [variable] | <subscription> | 0 . . . n | | <subscription> |
| [variable] | <pollingChannel> | 0 . . . n | If requestReachability is FALSE, the CSE that created this <remoteCSE> should create a <pollingChannel> resource and perform long polling. | <pollingChannel> |
| [variable] | <schedule> | 0 . . . 1 | This resource defines the reachability schedule information of the node. | <scheduleAnnc> |

In some embodiments, the <remoteCSE> resource may include attributes listed in Table 5.

TABLE 5

| Attribute Name of <remoteCSE> | Multiplicity | RW/RO/WO | Description | <remoteCSEAnnc> Attributes |
|---|---|---|---|---|
| resourceType | 1 | RO | | NA |
| parentID | 1 | RO | | NA |
| creationTime | 1 | RO | | NA |
| lastModifiedTime | 1 | RO | | NA |
| expirationTime | 1 | RW | | MA |
| accessControlPolicies | 0 ... n | RW | | MA |
| labels | 0 ... 1 | RW | | MA |
| announceTo | 1 | RW | | NA |
| announcedAttribute | 1 | RW | | NA |
| cseType | 1 | WO | Indicates the type of CSE node represented by the created resource. | OA |
| pointOfAccess | 0 ... n | RW | For request-reachable remote CSE it represents the list of physical addresses to be used to connect to it (e.g., IP address, FQDN). The attribute is absent if the remote CSE is not request-reachable. | OA |
| CSEBase | 1 | WO | The URI of the CSEBase of the original CSE represented by remote CSE. | OA |
| CSE-ID | 1 | WO | The globally unique CSE identifier. | OA |
| M2M-Ext-ID | 0 ... 1 | RW | Supported at IN-CSE only. This attribute is used only in case of dynamic association of M2M-Ext-ID and CSE-ID | NA |
| Trigger-Recipient-ID | 0 ... 1 | RW | Supported at IN-CSE only. This attribute is used only in case of dynamic association of M2M-Ext-ID and CSE-ID | NA |
| requestReachability | 1 | RW | If the CSE that created this <remoteCSE> can receive a request from other AE/CSE(s), this attribute is set to "TRUE" otherwise "FALSE". Even if this attribute is set to "FALSE", it may not mean it AE/CSE is always unreachable by all entities. E.g., the requesting AE/CSE is behind the same NAT, so it can communicate within the same NAT. | OA |
| nodeLink | 0 ... 1 | RO | Reference URI of a <node> resource that stores node specific information. | OA |

In some embodiments, <remoteCSE> and announced <remoteCSE> will have different resourceType coding for implementations to be able to discern between the two resources.

Figure 5:
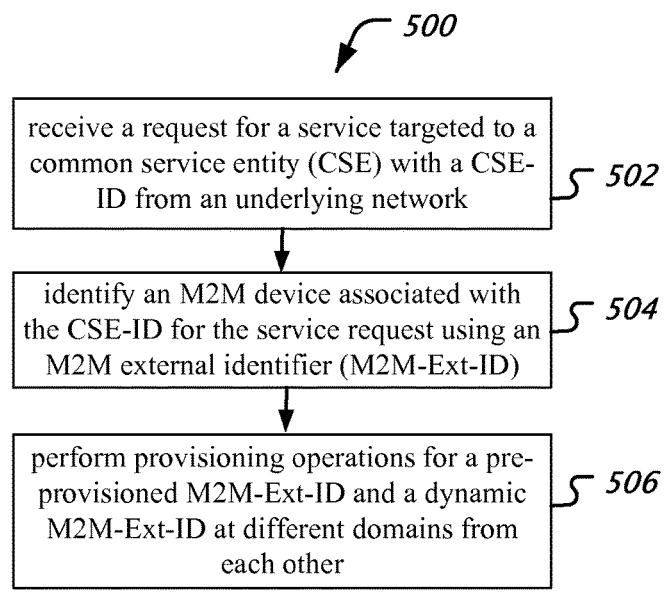
FIG. 5 shows an example of a method of facilitating M2M communication.

FIG. 5 shows an example flowchart of a method 500 of facilitating M2M communication.

The method 500 includes, at 502, receiving a request for a service targeted to a common service entity (CSE) with a CSE-ID from an underlying network.

The method 500 includes, at 504, identifying an M2M device associated with the CSE-ID for the service request using an M2M external identifier (M2M-Ext-ID).

The method 500 includes, at 506, performing a provisioning operations for a pre-provisioned M2M-Ext-ID and a dynamic M2M-Ext-ID at different domains from each other. In some embodiments, the provisioning operations may be performed by provisioning, for a pre-provisioned M2M-Ext-ID, the M2M-Ext-ID along with an associated CSE-ID at an infrastructure node in an infrastructure domain and provisioning, for a dynamic M2M-Ext-ID, the M2M-Ext-ID at a M2M device hosting the CSE in a field domain.

In some embodiments, the method 500 further includes mapping the M2M-Ext-ID to an underlying network specific identifier. In some embodiments, the method may further include maintaining the association among the CSE-ID, the M2M-Ext-ID and the underlying network specific identifier.

In some embodiments, the M2M-Ext-ID provisioned in the field domain is transferred to an IN-CSE.

Figure 6:
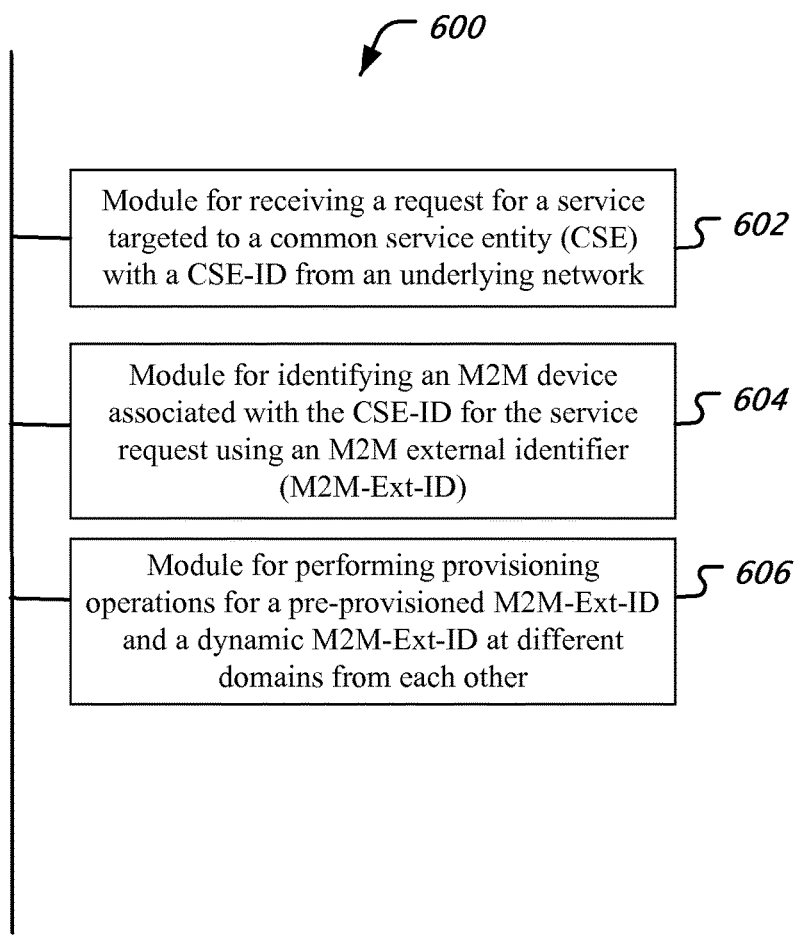
FIG. 6 shows an example of an apparatus for facilitating M2M communication.

FIG. 6 shows an example apparatus 600 for facilitating M2M communication. The apparatus 600 includes a module 602 for receiving a request for a service targeted to a common service entity (CSE) with a CSE-ID from an underlying network, a module 604 for identifying an M2M device associated with the CSE-ID for the service request using an M2M external identifier (M2M-Ext-ID), and a module 606 for performing provisioning operations for a pre-provisioned M2M-Ext-ID and a dynamic M2M-Ext-ID at different domains from each other. The modules 602, 604 and 606 and apparatus 600 may further implement techniques disclosed in this document.

Figure 7:
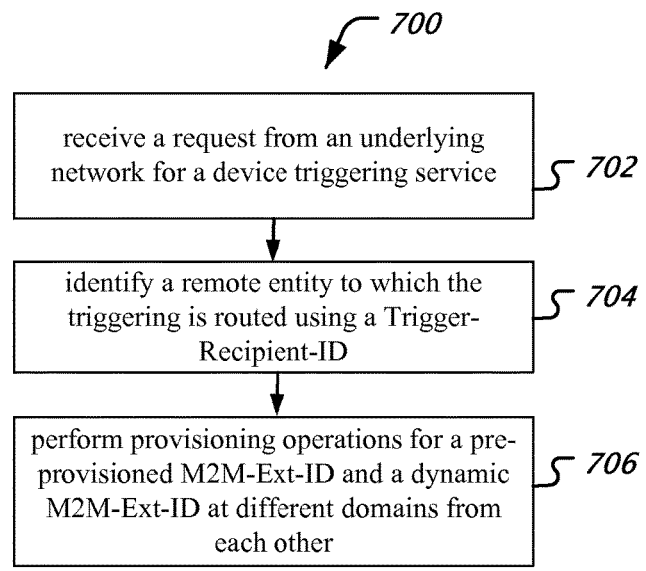
FIG. 7 shows an example flowchart for a method 700 for facilitating Machine-to-Machine (M2M) communication.

FIG. 7 shows an example flowchart for a method 700 for facilitating Machine-to-Machine (M2M) communication.

The method 700 includes, at 702, receiving a request from an underlying network for a device triggering service.

The method 700 includes, at 704, identifying a remote entity to which the triggering is routed using a Trigger-Recipient-ID.

The method 700 includes, at 706, performing provisioning operations for a pre-provisioned M2M-Ext-ID and a dynamic M2M-Ext-ID at different domains from each other.

In some implementations, the performing of the provisioning operations (706) includes provisioning, for a pre-provisioned M2M-Ext-ID, the Trigger-Recipient-ID at an infrastructure node in an infrastructure domain, and provisioning, for a dynamic M2M-Ext-ID, the Trigger-Recipient-ID at a M2M device hosting a common service entity (CSE) in a field domain. In some implementations, the performing of the provisioning operations further includes provisioning the M2M-Ext-ID and an associated CSE-ID at the infrastructure node. In some implementations, the Trigger-Recipient-ID provisioned in the field domain is transferred to an IN-CSE.

Figure 8:
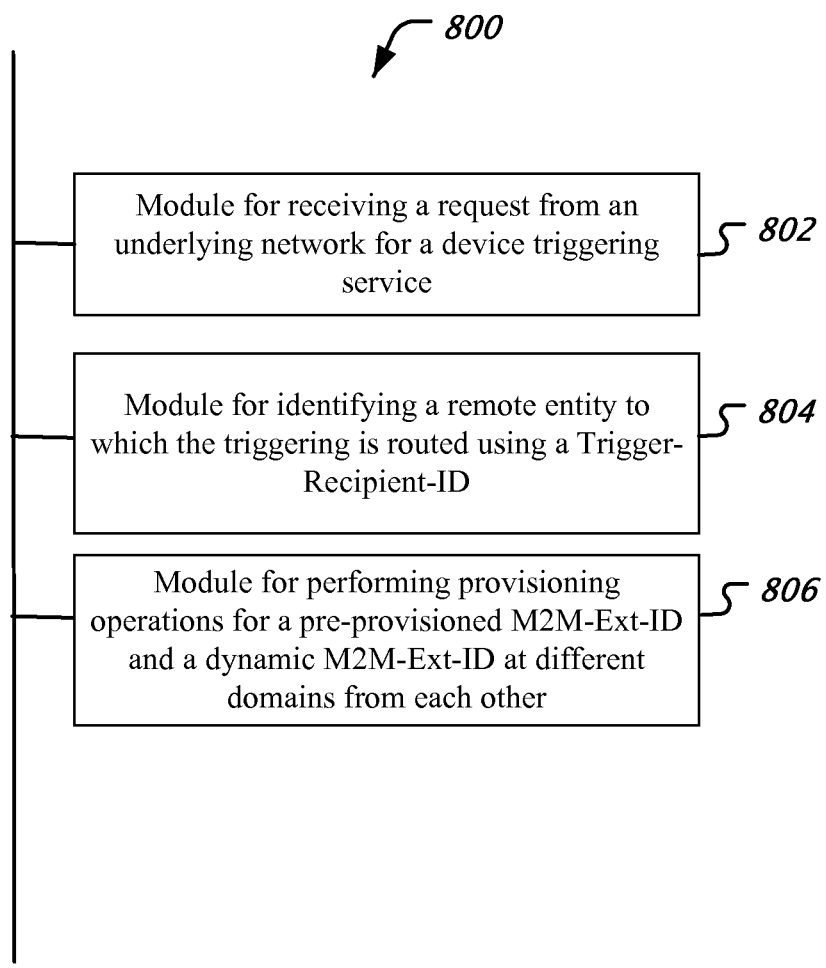
FIG. 8 shows an example block diagram of an apparatus 800 for facilitating Machine-to-Machine (M2M) communication.

FIG. 8 shows an example block diagram of an apparatus 800 for facilitating Machine-to-Machine (M2M) communication. The apparatus 800 includes a receiving module 802 for receiving a request from an underlying network for a device triggering service, an identifying module 804 for identifying a remote entity to which the triggering is routed using a Trigger-Recipient-ID, and a provisioning module 806 for performing provisioning operations for a pre-provisioned M2M-Ext-ID and a dynamic M2M-Ext-ID at different domains from each other.

In some implementations, the provisioning module provisions, for a pre-provisioned M2M-Ext-ID, the Trigger-Recipient-ID at an infrastructure node in an infrastructure domain and provisions, for a dynamic M2M-Ext-ID, the Trigger-Recipient-ID at a M2M device hosting a common service entity (CSE) in a field domain. In some implementations, the provisioning module further provisions the M2M-Ext-ID and an associated CSE-ID at the infrastructure node. In some implementations, the Trigger-Recipient-ID provisioned in the field domain is transferred to an IN-CSE.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for facilitating Machine-to-Machine (M2M) communication, the method comprising:
  receiving a request for a service targeted to a common service entity (CSE) with a CSE-ID from an underlying network, wherein the CSE comprises one or more service functions that are common to multiple M2M services;
  identifying an M2M device associated with the CSE-ID for the service request using an M2M external identifier (M2M-Ext-ID) associated with the M2M device; and
  performing provisioning operations for at least one of a pre-provisioned M2M-Ext-ID and a dynamic M2M-Ext-ID at different domains from each other, wherein
    the M2M-Ext-ID is pre-provisioned along with an associated CSE-ID at an infrastructure node in an infrastructure domain, and
    the M2M-Ext-ID is provisioned in a dynamic mode in which the M2M-Ext-ID is provisioned at the M2M device hosting the CSE in a field domain, and in which the M2M-Ext-ID is transferred to an IN-CSE during a CSE registration.

2. The method of claim 1, further including:
  mapping the M2M-Ext-ID to an underlying network specific identifier.

3. The method of claim 2, further including:
  maintaining the association among the CSE-ID, the M2M-Ext-ID and the underlying network specific identifier.

4. An apparatus for facilitating Machine-to-Machine (M2M) communication comprising:
  a receiving module implemented in hardware that receives a request for a service targeted to a common service entity (CSE) with a CSE-ID from an underlying network;
  an identifying module implemented in hardware that identifies a M2M device associated with the CSE ID for the service request using a M2M external identifier (M2M-Ext-ID); and
  a provisioning module implemented in hardware that performs provisioning operations for a pre-provisioned M2M-Ext-ID and a dynamic M2M-Ext-ID at different domains from each other, wherein the M2M-Ext-ID is pre-provisioned along with an associated CSE-ID at an infrastructure node in an infrastructure domain, and the M2M-Ext-ID is provisioned in a dynamic mode in which the M2M-Ext-ID is provisioned at the M2M device hosting the CSE in a field domain, and in which the M2M-Ext-ID is transferred to an IN-CSE during a CSE registration.

5. The apparatus of claim 4, wherein the underlying network maps the M2M-Ext-ID to the underlying network specific identifier allocated to the M2M device.

6. The apparatus of claim 4, wherein the CSE at the M2M device does not recognize the M2M-Ext-ID assigned to the M2M device.

7. A method for facilitating Machine-to-Machine (M2M) communication, the method comprising:
  receiving a request from an underlying network for a device triggering service;
  identifying a remote entity to which the triggering is routed using a Trigger-Recipient-ID attributed received with the request; and
  performing provisioning operations for at least one of a pre-provisioned Trigger-Recipient-ID and a dynamic Trigger-Recipient-ID at different domains from each other, wherein
    the Trigger-Recipient-ID is pre-provisioned at an infrastructure node in an infrastructure domain, and
    the Trigger-Recipient-ID is provisioned in a dynamic mode in which the Trigger-Recipient-ID is provisioned at the M2M device hosting the CSE in a field domain, and in which the Trigger-Recipient-ID is transferred to an IN-CSE during a CSE registration.

8. The method of claim 7, the performing of the provisioning operations further including:
  provisioning, for the pre-provisioned Trigger-Recipient-ID, a M2M-Ext-ID and an associated CSE-ID at the infrastructure node.

9. The method of claim 8, wherein the M2M-Ext-ID is transferred along with the Trigger-Recipient-ID to the IN-CSE during the CSE registration.

10. An apparatus for facilitating Machine-to-Machine (M2M) communication, comprising:
  a receiving module implemented in hardware that receives a request from an underlying network for a device triggering service;
  an identifying module implemented in hardware that identifies a remote entity to which the triggering is routed using a Trigger-Recipient-ID; and
  a provisioning module implemented in hardware that performs provisioning operations for a pre-provisioned M2M Ext ID Trigger-Recipient-ID and a dynamic M2M Ext ID Trigger-Recipient-ID at different domains from each other, wherein the Trigger-Recipient-ID is pre-provisioned at an infrastructure node in an infrastructure domain, and the Trigger-Recipient-ID is provisioned in a dynamic mode in which the Trigger-Recipient-ID is provisioned at the M2M device hosting the CSE in a field domain, and in which the Trigger-Recipient-ID is transferred to an IN-CSE during a CSE registration.

11. The apparatus of claim 10, wherein the provisioning module further provisions, for the pre-provisioned Trigger-Recipient-ID, a M2M-Ext-ID and an associated CSE-ID at the infrastructure node.

12. The apparatus of claim 10, wherein the M2M-Ext-ID is transferred along with the Trigger-Recipient-ID to the IN-CSE during the CSE registration.

13. A computer program product having a non-transitory tangible computer readable storage medium having code stored thereon, the code, when executed, causing a processor to implement a method that comprises:
  receiving a request for a service targeted to a common service entity (CSE) with a CSE-ID from an underlying network, wherein the CSE comprises one or more service functions that are common to multiple M2M services;
  identifying an M2M device associated with the CSE-ID for the service request using an M2M external identifier (M2M-Ext-ID) associated with the M2M device; and
  performing provisioning operations for at least one of a pre-provisioned M2M-Ext-ID and a dynamic M2M-Ext-ID at different domains from each other, wherein
    the M2M-Ext-ID is pre-provisioned along with an associated CSE-ID at an infrastructure node in an infrastructure domain, and
    the M2M-Ext-ID is provisioned in a dynamic mode in which the M2M-Ext-ID is provisioned at the M2M device hosting the CSE in a field domain, and in which the M2M-Ext-ID is transferred to an IN-CSE during a CSE registration.

14. The computer program product of claim 13, wherein the method further includes:
mapping the M2M-Ext-ID to an underlying network specific identifier.

15. The computer program product of claim 14, wherein the method further includes:
maintaining the association among the CSE-ID, the M2M-Ext-ID and the underlying network specific identifier.

16. A computer program product having a non-transitory tangible computer readable storage medium having code stored thereon, the code, when executed, causing a processor to implement a method that comprises:
receiving a request from an underlying network for a device triggering service;
identifying a remote entity to which the triggering is routed using a Trigger-Recipient-ID attributed received with the request; and
performing provisioning operations for at least one of a pre-provisioned Trigger-Recipient-ID and a dynamic Trigger-Recipient-ID at different domains from each other, wherein
the Trigger-Recipient-ID is pre-provisioned at an infrastructure node in an infrastructure domain, and
the Trigger-Recipient-ID is provisioned in a dynamic mode in which the Trigger-Recipient-ID is provisioned at the M2M device hosting the CSE in a field domain, and in which the Trigger-Recipient-ID is transferred to an IN-CSE during a CSE registration.

17. The computer program product of claim 16, the performing of the provisioning operations further including:
provisioning, for the pre-provisioned Trigger-Recipient-ID, a M2M-Ext-ID and an associated CSE-ID at the infrastructure node.

18. The computer program product of claim 16, wherein the M2M-Ext-ID is transferred along with the Trigger-Recipient-ID to the IN-CSE during the CSE registration.

* * * * *